(12) United States Patent
Gobeli

(10) Patent No.: US 6,222,667 B1
(45) Date of Patent: Apr. 24, 2001

(54) ELECTRO-OPTIC LIGHT VALVE ARRAY

(75) Inventor: Garth W. Gobeli, Albuquerque, NM (US)

(73) Assignee: Advanced Optics Electronics, Inc., Albuquerque, NM (US)

( * ) Notice: Subject to any disclaimer, the term of this patent is extended or adjusted under 35 U.S.C. 154(b) by 0 days.

(21) Appl. No.: 09/247,157

(22) Filed: Feb. 9, 1999

(51) Int. Cl.$^7$ ............................... G02F 1/00; G02F 1/29; G02F 26/00
(52) U.S. Cl. ..................... 359/323; 359/322; 359/315; 359/237
(58) Field of Search ..................... 359/323, 322, 359/315, 237; 345/47

(56) References Cited

U.S. PATENT DOCUMENTS

| | | |
|---|---|---|
| 4,119,358 | 10/1978 | Yamazaki . |
| 4,441,791 | 4/1984 | Hornbeck . |
| 4,707,081 | 11/1987 | Mir . |
| 4,802,741 | 2/1989 | Kaukeinen . |
| 4,854,678 | * 8/1989 | Kitano ................................... 350/356 |
| 4,887,104 | 12/1989 | Kitano et al. . |
| 4,993,811 | 2/1991 | Blazey et al. . |
| 5,155,618 | 10/1992 | Matsubara et al. . |
| 5,198,920 | 3/1993 | Gobeli . |
| 5,221,989 | 6/1993 | Stappaerts et al. . |
| 5,260,719 | 11/1993 | Maloney . |
| 5,416,631 | 5/1995 | Yagi et al. . |
| 5,631,735 | 5/1997 | Nagai . |

\* cited by examiner

Primary Examiner—Georgia Epps
Assistant Examiner—Michael A. Lucas
(74) Attorney, Agent, or Firm—Andrea L. Mays; Rod D. Baker; Deborah A. Peacock

(57) ABSTRACT

A two-dimensional light valve array comprising a pattern of reduced electrode spacing solid state light valves formed using semiconductor processing techniques, and a method of making same. The electrodes are recessed into channels in an electro-optic substrate, such as lanthanum modified lead zirconate-titanate (PLZT). A first set of electrodes are deposited in a comb-shaped configuration into parallel and orthogonal channels etched into the PLZT substrate. A second set of deposited electrodes are bands running in alternating channels between the teeth of the first set of electrodes. An insulating material isolates the two sets of electrodes. An applied voltage between the electrodes induces bi-refringence in the PLZT and affects light transmissivity through the light valve at that location. The array is activated electronically by means of matrix addressing and controlled by means of a microcomputer and appropriate software. Reduced electrode spacing within the PLZT material offers benefits of reduced activation voltage, reduced pixel size, higher image resolution, and increased brightness.

60 Claims, 6 Drawing Sheets

ELECTRO-OPTIC LIGHT VALVE ARRAY

BACKGROUND OF THE INVENTION

1. Field of the Invention (Technical Field)

The present invention relates to a high-density, high-resolution array of light valves that can be selectively activated by low induced voltages to alter a light beam passing through the array. The present invention also relates to a process for manufacturing such a high density light valve array using semiconductor-type processing equipment and techniques.

2. Background Art

In much the same way that single crystal silicon can be processed to selectively permit or block the passage of electrons (conductivity), an electro-optic material, such as lanthanum modified lead zirconate titanate (PLZT), can be processed to permit or block the passage of a beam of light by application of an electric field, between two electrodes in the material, perpendicular to the direction of the light beam. In both cases, the starting material is a wafer which is cut from a cylindrical boule and then subjected to processing steps that build microstructures on one side of the wafer.

The application of an electric field induces birefringence in a transparent PLZT material. Bi-refringence is a rotation in the plane of polarization within the PLZT material. This phenomenon is referred to as the Kerr effect. The configuration of two oppositely charged electrodes separated by an electro-optic material, such as PLZT, and sandwiched between two polarizers is well known in the art and referred to as a Kerr cell. Once induced, the bi-refringence in the electro-optic material of a Kerr cell can lower, or increase light transmission through the cell. In applications where electrode spacing within the PLZT is very small, selective electronic birefringent addressing can be used to create a small high-resolution display or high quality image, which can be directly viewed, or projected and enlarged.

Reduced electrode spacing within the PLZT material is particularly desirable as it offers benefits of reduced activation voltage, reduced picture cell (pixel) size, and higher image resolution. Higher electrode density also induces the problems of increased manufacturing costs and complexity, and difficulty in connecting the array electrodes to those of other arrays or to controlling electronics, such as printed circuit boards.

Reduced electrode spacing has been achieved in the prior art predominately through the use of mechanical grooving of the PLZT substrate, longitudinal (parallel to light beam) activation of the PLZT, and/or stenciling techniques for placement of the electrodes within the grooves. However, such manufacturing techniques limit the number of light valves, or picture cells (pixels), to numbers on the order of 25 to 100 pixels per linear inch. Pixel dimensions on the order of those disclosed in the prior art also suffer the disadvantages of high activation voltages (100 to 500 VDC), cumbersome requirements for electrical contact designs, and very high lead counts.

The transversely activated electro-optic light valve array in U.S. Pat. No. 5,198,920, co-authored by the inventor of the present invention, discloses means to overcome the switching time, voltage, and addressing shortcomings of the prior art Gobeli et al. '920, discloses a two-dimensional array of Kerr cell pixels defined in an electro-optic material, such as PLZT, between adjacent electrodes deposited onto the substrate. The array may be addressed optically or electronically to generate an electric field in the electro-optic material. Pixel densities as high as 1000 pixels per linear inch are possible using the technology disclosed in Gobeli et al. '920.

The present invention constitutes a significant improvement over this prior aft patent by the use of semiconductor processing technology to further increase pixel density and reduce activation voltage. It further offers the advantage of increased light transmission (brightness) through the PLZT material by a reduction in surface area of the PLZT required for the non-transmissive electrodes.

SUMMARY OF THE INVENTION
(DISCLOSURE OF THE INVENTION)

The present invention is directed to a light valve array comprising a pattern of very small solid state light valves and a process of manufacture. Each valve consists of two electrodes of one polarity and one electrode of opposite polarity formed using semiconductor processing techniques. Said electrodes are recessed into channels formed in an electro-optic substrate using photolithography, etching, and thin film deposition techniques. The channels have widths of approximately 1.5 to 2.5 microns and the pedestals between the channels have widths of approximately 6 to 8 microns. The electro-optic material can be either $LiNbO_3$, $BaTiO_3$, or lanthanum modified lead zirconate titanate, but the preferred electro-optic material is non-memory mode lanthanum modified lead zirconate-titanate (PLZT) that responds to an induced electric field through bi-refringence. As the manufacturing process, in accordance with the present invention, is capable of very high pixel densities, the array is preferably activated electronically, with preferably 12 to 15 volts DC, rather than optically, to generate an electric field in the electro-optic material and thus activate the pixels. Light that is passed through the array will either be transmitted through the array or largely blocked depending upon the voltage applied to each Kerr cell.

Further, the preferred means of addressing the large number of pixels is by means of matrix addressing, where each pixel is electronically connected to one row lead and one column lead and is controlled by control circuitry, preferably by means of a microcomputer and appropriate software. In a preferred embodiment of the invention, one set of conductive metallization activation electrodes ("Y" orientation) is deposited in a teeth and backbone comb-shaped configuration into parallel and orthogonal channels etched into the PLZT substrate. The second set of conductive metallization activation electrodes ("X" orientation) are deposited running in X-oriented alternating channels between the teeth of the earlier deposited Y-oriented electrodes. An insulating material is deposited between the Y- and X-oriented electrodes to electrically isolate the two conductive patterns from one another. An applied voltage between a given Y-oriented electrode and a given x-oriented electrode causes a single light valve, or Kerr cell, to be activated, which induces bi-reference in the electro-optic material and affects light transmissivity through the Kerr cell only at that location.

Optionally, transistors can be connected to each pair of electrodes to block voltage to the Kerr cell until a pre-selected voltage is reached and then the cell is activated. Colored filters can also be deposited over the electro-optic material pedestals between each pair of electrodes to enable colored pixels. Also, a conductive flash coating can be deposited near either electrode conductive layer for dissipating residual electric charge.

It is a primary object of the present invention to provide a high density electro-optic light valve array which has reduced operating voltage, enhanced speed of operation, minimum cross-talk between pixels, and high brightness.

It is another primary object of this invention to provide a manufacturing process for a high density electro-optic light valve array using modified silicon semiconductor photolithography, etching, and thin film deposition technology and equipment.

It is another object of the present invention to provide a high density electro-optic light valve array with reduced operating voltages compatible with current commercially available silicon large scale integration technology and display circuitry designed for use with liquid crystal displays.

It is yet another object of the present invention to provide a high density electro-optic light valve array with minimized electrode line widths and maximized light transmission capabilities.

It is yet another object of the present invention to provide a manufacturing process that is capable of producing electro-optic light valve arrays with densities of up to 1.5 million pixels per square inch.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

Figure 1A:
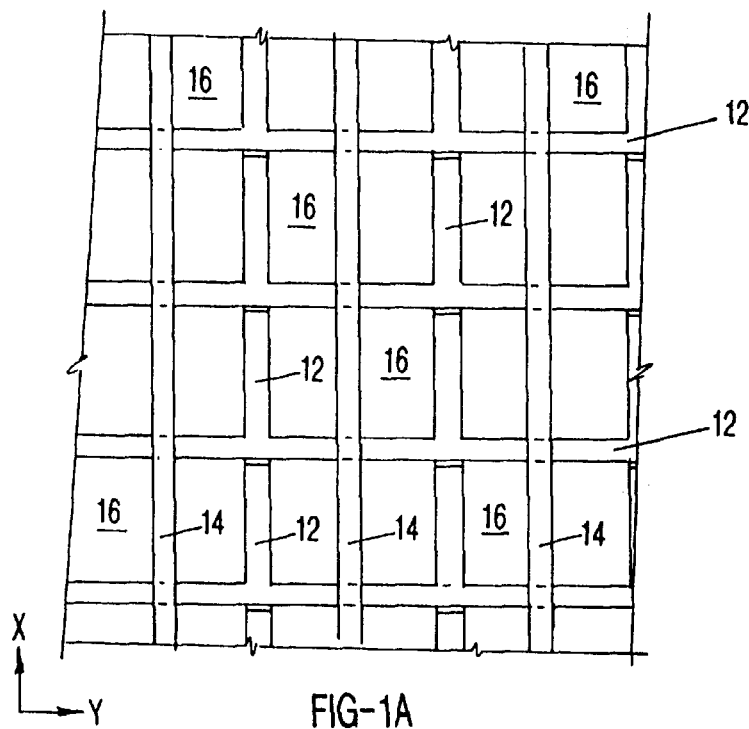
FIG. 1A is a top view of a two-dimensional light valve array in accordance with the present invention.
Figure 1B:
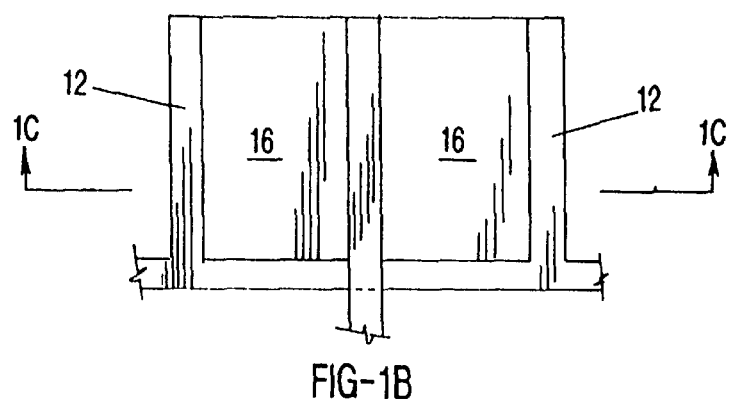
FIG. 1B is an enlarged top view in accordance with FIG. 1A, showing in greater detail the avenue and street electrode structure.
Figure 1C:
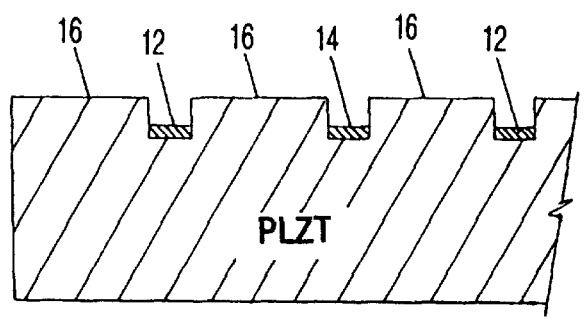
FIG. 1C is a cross section taken through line 1C—1C of FIG. 1B, showing the avenue and street electrode structure deposited in channels etched onto the PLZT substrate.

Referring to FIGS. 1A–1C, a two-dimensional light valve array in accordance with the present invention is shown generally as 10. The light valve array 10 consists of closely spaced light valves, in a Kerr cell configuration, which are formed in a layer of an electro-optic material such as LiNbO$_3$, BaTiO$_3$, or, preferably, lanthanum modified lead zirconate titanate, or PLZT.

Y-oriented channels and x-oriented channels are formed into the PLZT and receive y-oriented and x-oriented electrodes. Portions of the y-oriented electrodes go into x-oriented channels. Y-oriented electrodes 12 are configured in a teeth and backbone comb-shaped structure. X-orientated electrodes 14 are conducting ribbons and are transverse to the backbone structure of y-orientated electrodes 12. As will be more fully described hereinafter, the electrodes are electrically isolated from each other at the point of crossover by means of a deposited insulating material. Y-orientated channels in the PLZT will be referred to herein as avenues, and y-orientated electrodes 12 will be referred to as avenue electrodes 12. X-orientated channels in the PLZT will be referred to as streets, and x-orientated electrodes 14 as street electrodes 14. The generally square or rectangular shaped elevated plane structures of PLZT material which result from the forming of streets and avenues will be referred to as pedestals 16.

The process of producing a light valve array in accordance with the present invention involves the use of photolithography equipment and techniques, capable of dimensional placement precision of 0.5 microns ($\mu$) or less, which are very well known in the semiconductor industry for the production of silicon semiconductor devices. The light valve array is fabricated from a wafer of poly crystalline non-memory mode PLZT of appropriate composition and grain size by means of a conventional four photomask photolithographic process well known in the art. The wafer is sliced from a cylinder, or boule, of the PLZT material and the resulting two surfaces of the wafer are polished smooth. PLZT wafers of up to six inches in diameter are presently commercially available and compatible with commercially available semiconductor processing equipment. However, boules of up to twelve inches in diameter, and larger, may feasibly be processed using conventional technology.

Figure 2:
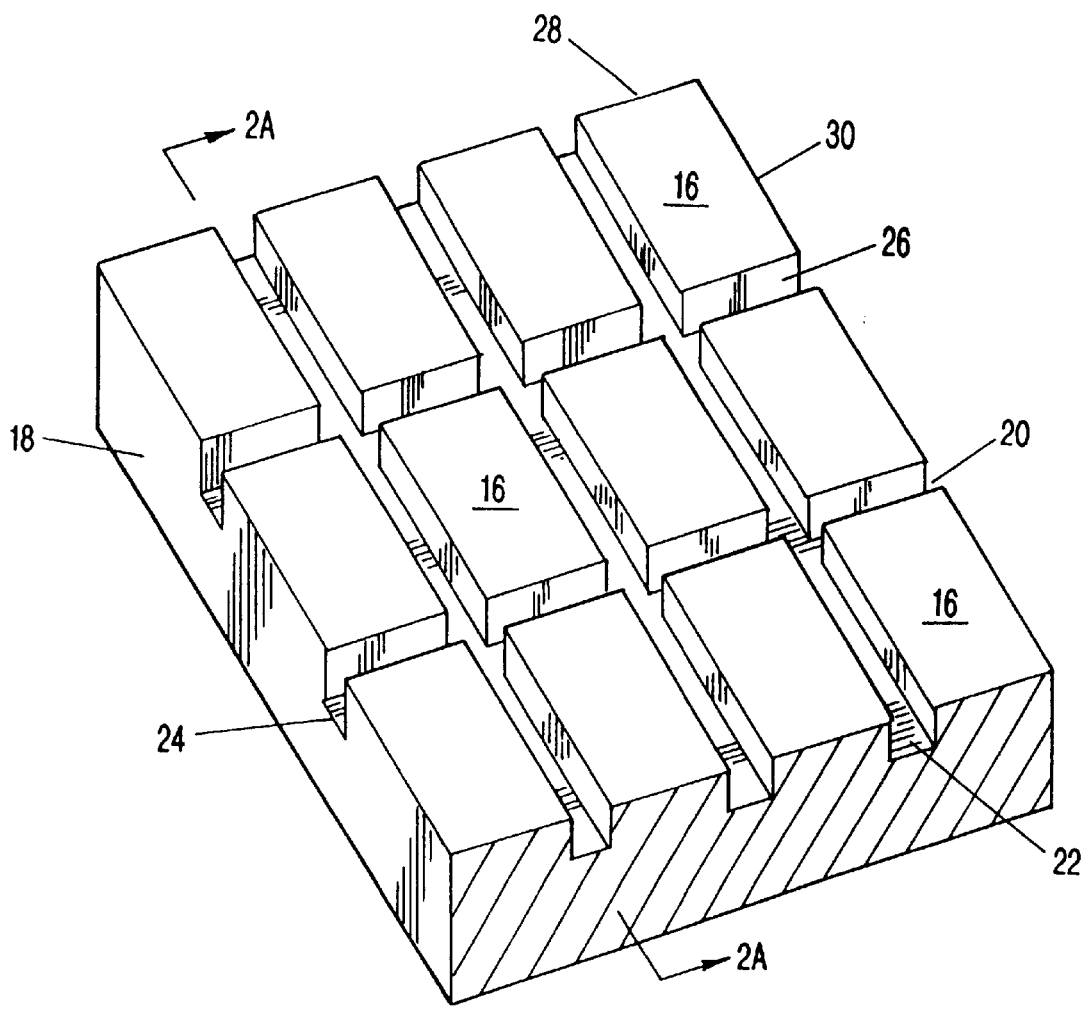
FIG. 2 is a perspective view of the electrode channel etch pattern on the PLZT substrate.
Figure 2A:
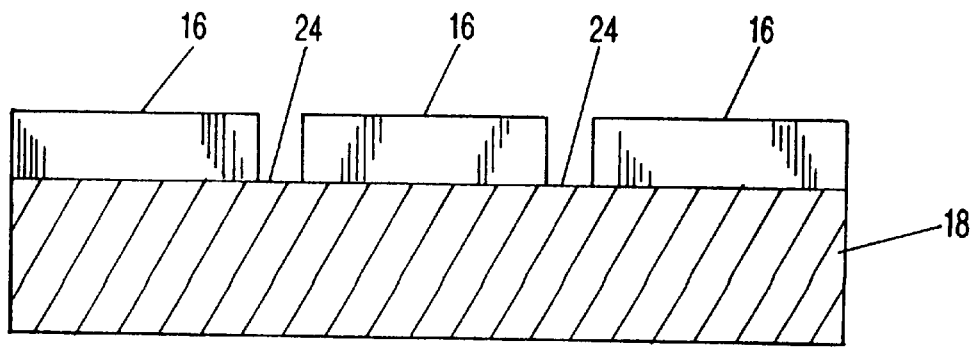
FIG. 2A is a cross section taken through line 2A—2A of FIG. 2.

Referring now to FIGS. 2 and 2A, the PLZT wafer substrate 18 is coated with positive photoresist then exposed and patterned using a photomask. After patterning, a developer solution dissolves all exposed photoresist, leaving exposed areas of the PLZT substrate in the configuration of y-orientated avenues 20 and x-orientated streets 22. The substrate and patterned photoresist are then exposed to a wet etching solution, such as hydrofluoric acid mixtures well known in the art, which etches and reproduces avenues 20 and streets 22 from the photomask into the PLZT substrate surface. After completion of the etching process, the photoresist used to establish the etching pattern in the substrate is then removed using a stripping process well known in the art.

The pattern widths on the photomasks used and the parameters of the etching process are adjusted such that avenues 20 and streets 22 have widths 24 in the range of 1.5–2.5µ at the surface of the PLZT substrate. The etching process is also controlled such that the resulting avenue or street depth/pedestal sidewall height 26 is in the range of 2–4µ, more or less, below the top surface of the PLZT substrate. After the etching process, the pedestals 16 in the PLZT substrate have a width 28 in the range of 6–8 microns. The pedestal length 30 is preferably in the range of 18–20µ. Where larger pixel sizes are desirable, the dimensional length of the pedestals may be increased, while maintaining pedestal width. In such a configuration, a number of Kerr cells may be commonly addressed, and the resulting large pixel is composed of a plurality of Kerr cells. This maintains the low operating voltage of the small dimensioned Kerr cells.

Figure 3:
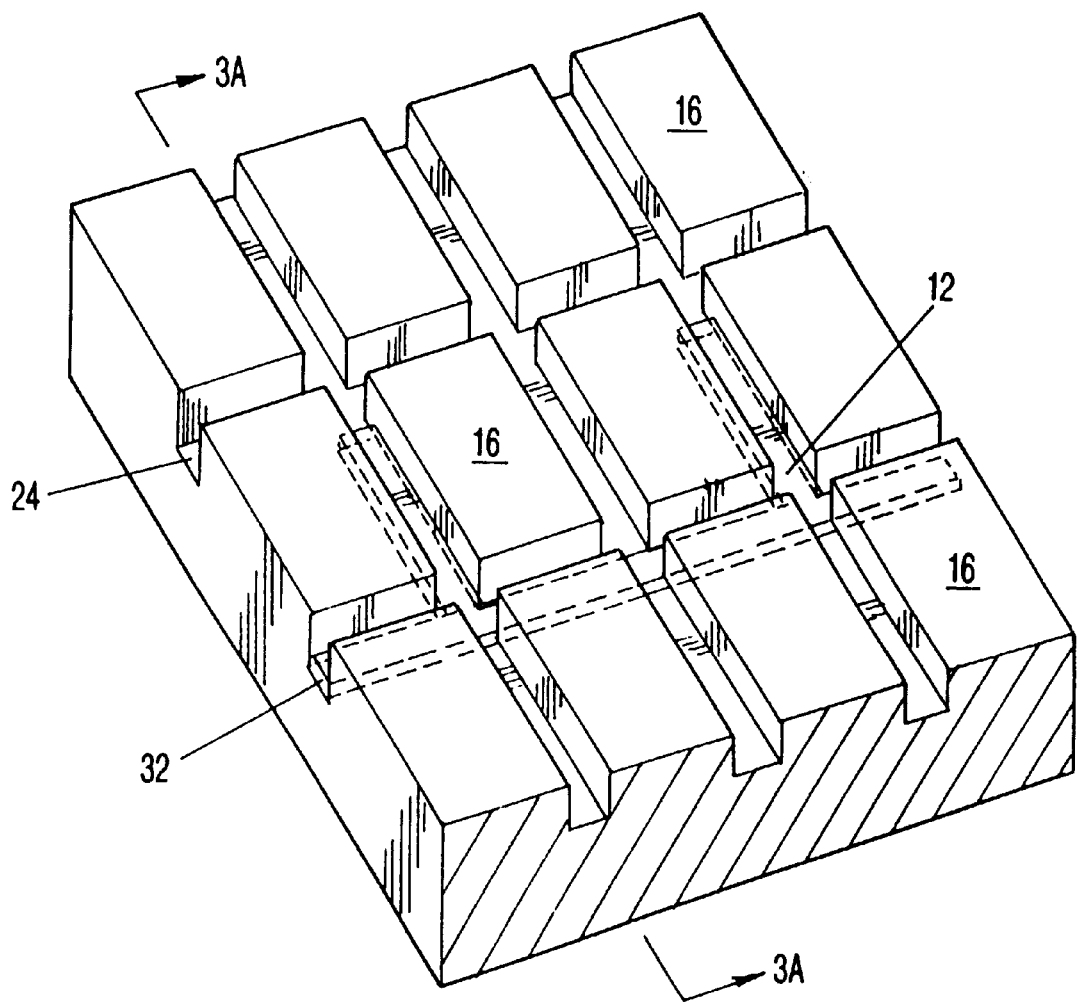
FIG. 3 illustrates the electrode channel etch pattern of FIG. 2 after deposition of Y-oriented avenue electrodes.
Figure 3A:
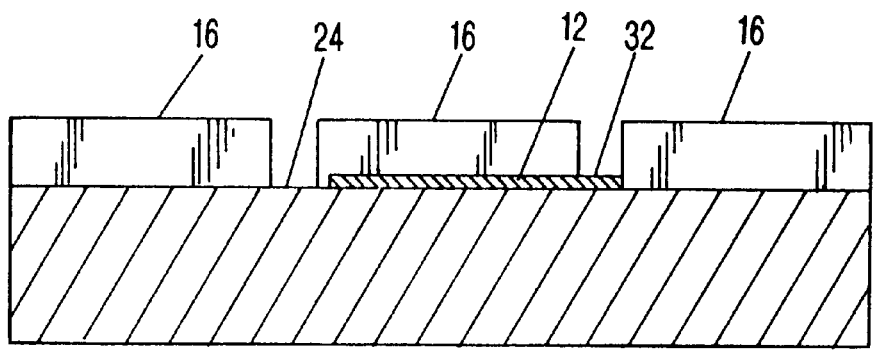
FIG. 3A is a cross section taken through line 3A—3A of FIG. 3.

Referring now to FIGS. 3 and 3A, the PLZT substrate is next covered with photoresist then exposed and patterned using a photomask. For the second masking layer, a pattern of y-oriented repeating comb-like structures is exposed and developed into the photoresist. This comb-like structure patterned into the photoresist must be accurately aligned with the streets and avenues previously etched into the PLZT substrate. The teeth of the comb-shaped structure extend along the streets 22 of the PLZT substrate, stopping at a point short of intersection with the next avenue of the PLZT substrate. A conductive metallization layer is then sputtered over the entire structure and into the open areas of the resist, to form the avenue electrodes 12. A typical material suitable for metallization is an alloy of chromium and gold. Thickness 32 of the avenue electrodes is on the order of 1000 Å, or more. After metallization of avenue electrodes, the second photoresist layer is then removed using a conventional stripping process.

Figure 4:
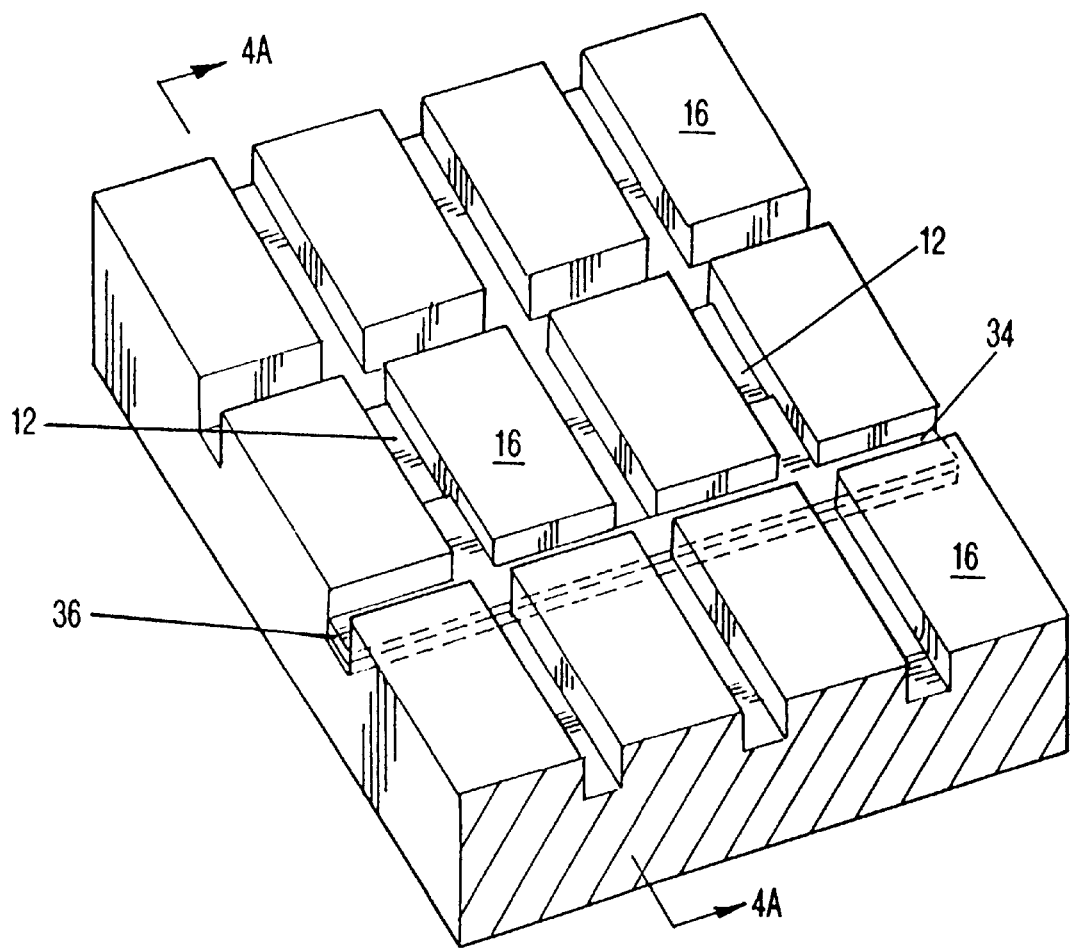
FIG. 4 illustrates the electrode channel etch pattern of FIGS. 2 and 3 after deposition of an insulating spin on-glass or SiO$_2$ layer over the Y-oriented avenue electrodes.
Figure 4A:
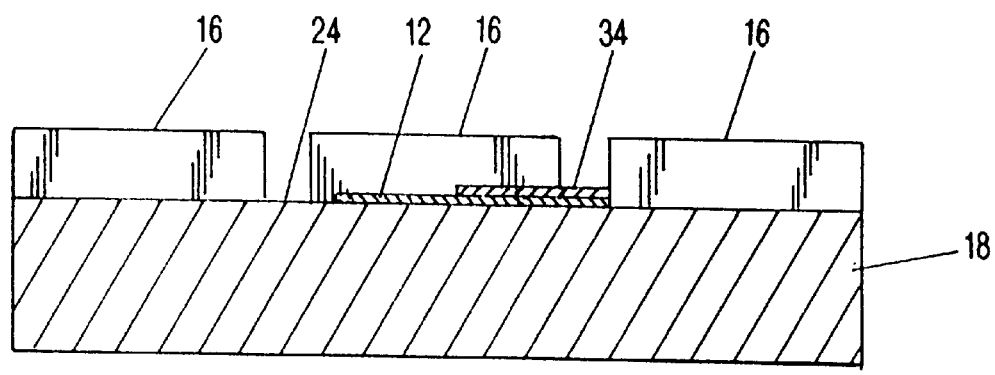
FIG. 4A is a cross section taken through line 4A—4A of FIG. 4.

Referring now to FIGS. 4 and 4A, a third layer of photoresist is applied over the entire surface of the PLZT wafer. The photoresist is then exposed, patterned, and developed to create in the same shape but slightly larger than the avenue electrodes 12 deposited in the previous processing step. The openings in the photoresist are then filled with an insulating layer 34 comprising spin-on-glass (SOG) or a sputtered layer of SiO2 (silica) which isolates the avenue electrodes 12 formed by the first metallization from the street electrodes 14 to be subsequently deposited. Insulating layer 34 has a thickness 36 on the order of 1000 Å, or more. After deposition of the insulating layer 34, the third photoresist layer is then removed using a conventional stripping process. The positioning of an insulating layer 34 between the avenue electrodes 12 and street electrodes 14 isolates the electrodes and provides a matrix addressing mode for the light valve array as discussed hereinafter.

Figure 5:
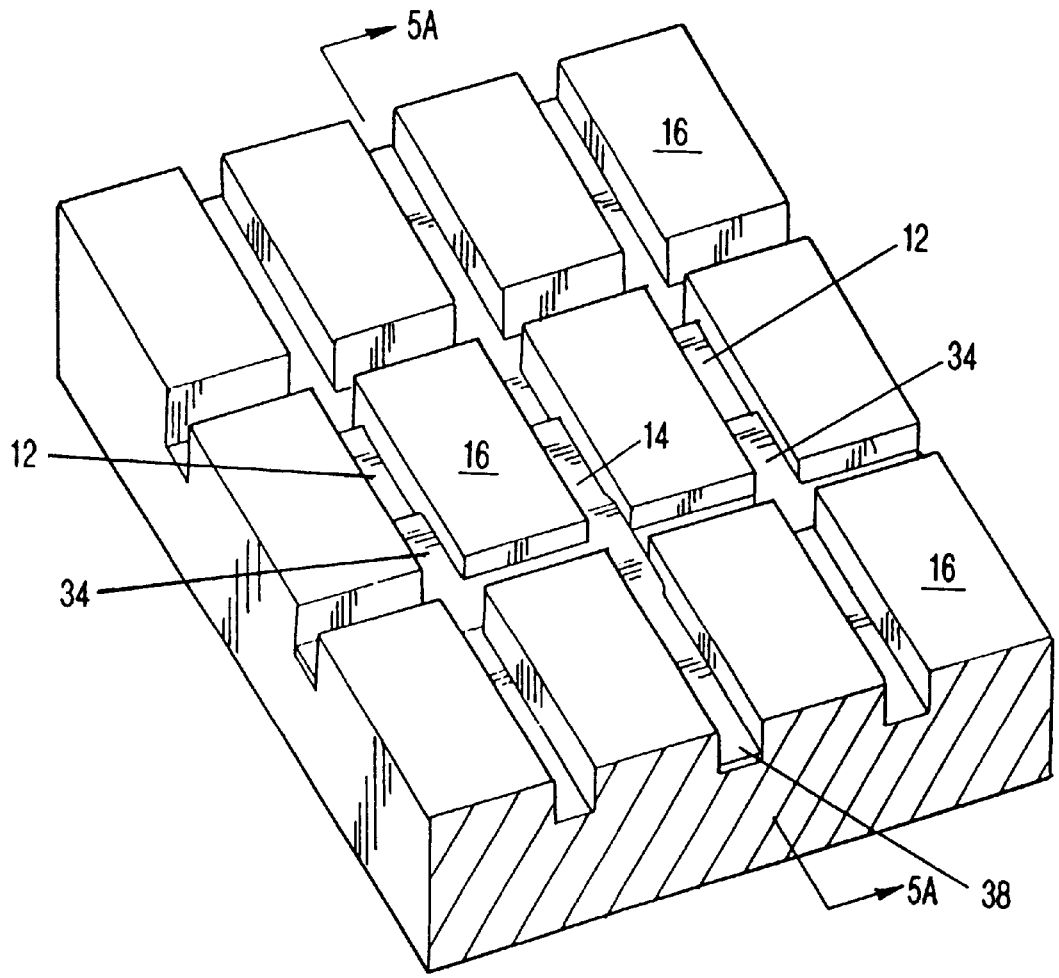
FIG. 5 illustrates the electrode channel etch pattern of FIGS. 2–4 after deposition of X-oriented street electrodes.
Figure 5A:
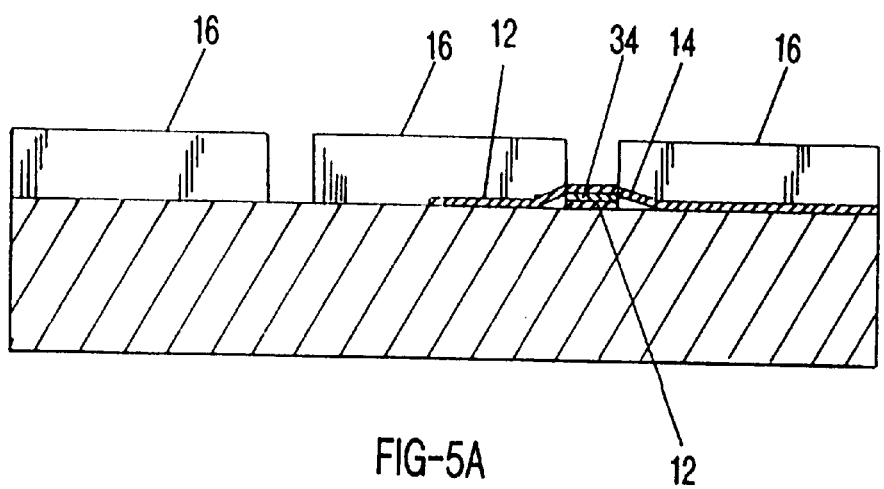
FIG. 5A is a cross section taken through line 5A—5A of FIG. 5.

Referring finally to FIGS. 5 and 5A, a fourth layer of photoresist is patterned with parallel stripes or bands that are aligned with and oriented on top of alternating x-oriented streets 22 etched into the PLZ'T substrate in the first masking step. This masking layer is used to define and deposit the second metallization layer of street electrodes 14 that run parallel to, and between, the teeth structure of the earlier deposited avenue electrodes 12 and on top of the insulating material layer 34. The second metallization layer forming street electrodes 14 has a thickness 38 of 1000 Å°, or more. After metal deposition using the same procedure that was used for the comb electrodes, the resist is removed using a conventional stripping process. A typical material suitable for metallization is an alloy of chromium and gold. As a final step, a SOG or a Silica over-layer may be utilized as a protective shield for the light valve array.

In FIG. 5 and for clarity of illustration, the second metallization layer forming street electrodes 14 is shown as filling the intersection of avenues 20 and streets 22 in the PLZT substrate. In actuality, the thickness of the combination of the avenue electrode 12, the insulating layer 30, and the street electrode 14 is generally less than 5000 Å, or 0.5µ. The composite will only fill a portion of channels cut in the PLZT substrate, which have depths in the range of 2–4µ. Since the etching process will in fact produce sloping vertical faces in the channels cut in the PLZT substrate, the electroding material will in fact be deposited on these faces as well as in the bottoms of the channels in a shape which approximately a U-shape when viewed in cross section. The net effect is similar to channels filled to the brim with electroding material.

In the process steps described herein, the avenue electrodes 12 were deposited first, followed by the street electrodes 14. It should be realized that this sequence is arbitrary. The street electrodes could be deposited first and followed by the avenue electrodes.

It should further be realized that additional processing steps can be added to the steps described herein to enhance performance of the light valve arrays. A very thin conductive flash coating of a titanium-molybdenum or conductive titanium-tungsten alloy can be applied prior to the deposition of the avenue electrodes 12, or after the deposition of the street electrodes 14, using techniques well known in the art. Such a conductive coating must be so thin as to be transparent to the passage of light. This thin conductive coating acts as a grounding or discharging medium which dissipates any residual electric charge retained by each Kerr cell after the power to that cell has been turned off (switched off state). A residual charge is retained in a Kerr cell because of the capacitor-type configuration of the cell. Any retained charge reduces the amount of contrast capable within the pixel since the retained charge reduces the total amount of bi-refringent change between the on-state and the off-state.

Conductive flash coatings are in common use in the semiconductor photomask making industry. The transparent conductive flash coating described herein is similar to the flash coating of tin-indium-oxide used on glass and quartz photomasks as an anti-static layer to prevent electro-static damage to chromium patterns used for semiconductor imaging. The coating on photomasks is used to dissipate static electricity in much the same way the coating on the PLZT is used to discharge capacitor-like structures in the light valve array. Conductive flash coatings also improve adhesion of substrate metallization processes.

Similarly, processing steps can also be added to address leakage voltage, which causes non-addressed cells to activate, thereby reducing contrast. One method to address this problem is to add thin film transistors at each pixel through a series of additional photolithographic deposition and etching processing steps. A thin film transistor placed in the path of the activation voltage will block all voltage to the pixel until the activation voltage of the transistor is reached. As long as the contrast reducing leakage voltage is below the transition voltage at which the transistor turns on, no involuntary partial activation of the pixel will occur. The addition of thin film transistors converts the array from a passive matrixing system to an active matrixing system. The addition of processing steps to provide flash coatings and thin film transistors to enhance array performance are well known to those skilled in the semiconductor processing industry. As may be best considered by reference to FIGS. 1B and 1C, a single pixel is comprised of the two pedestals of PLZT material on either side of the selected street electrode 14 and bounded by the selected avenue electrode 12. Voltage is applied to the electrodes by means of a control circuit discussed hereinafter such that the street electrodes are at one polarity and the avenue electrodes on both sides of the street electrodes are at the other polarity. As the street electrodes and the avenue electrodes are below the surface of the PLZT substrate on opposite sides of the pedestals, an induced electric field is applied to the pedestal sidewalls 26. This induces bi-refringence in the pedestals between the electrodes, allowing light to pass through these pedestals.

The electric field is applied by the selected/dose proximity street and avenue electrodes largely through the adjacent PLZT pedestals, resulting in greatly reduced operating voltages over prior art structures. For pedestals which have a width of 6–8 microns as discussed herein, it is expected that the operating voltage will be in the range of 12–15 VDC. The electroding geometry described herein also permits a relatively small percentage of the area of the light valve array to be occluded by the street and avenue electrodes. As a result, the overall optical throughput efficiency is high, possibly greater than 75 percent.

Colorization of the generated image is also possible. Standard photolithography can be used to deposit a red, green or blue filter over the upper surface of each light valve. In this configuration, three light valves are used to form a single pixel. Different combinations of "on" and "off" states for each of the three light valves results in a different color displayed in the image for that pixel. Because it takes three light valves to generate a pixel, the addition of color reduces the resolution of the display by the square root of three (1.73).

As the light valve array in accordance with the preferred embodiment as described herein is formed on a substrate of PLZT, the array shares many of the desirable properties of that material. Important PLZT properties when a light valve array is considered include a high speed of operation (<100 ns switching time), a very wide operating temperature range (>200 to <−50 degrees Celsius), optical transparency from 400 nm to 6 microns wavelength, a very high extinction ratio of >500 to 1, and zero pixel to pixel light bleed-through.

Current semiconductor processing equipment and technology permit fabrication of light valve arrays in pixel densities of up to 1.5 million pixels per square inch. The possibility of such very high pixel densities provides design challenges as to how to make electrical contact to such a large number of pixels, and how to selectively control the switching function of each pixel. The preferred means to activate each pixel is through electronic activation, and the preferred means to selectively control each pixel is through matrix addressing and suitable control circuitry.

To illustrate, consider a light valve array in accordance with the present invention which consists of 9 million pixels (3,000 avenue electrodes and 3,000 street electrodes). Older manufacturing techniques would require two leads for activation of each pixel for a total of 18 million leads. However, through the use of matrix addressing, wherein a single pixel is selected for activation by applying a voltage to a single avenue electrode and a single street electrode, any one of 9,000,000 pixels can be activated using only 6,000 contact points or leads (3,000 for the avenue electrodes; 3,000 for the street electrodes).

Figure 6:
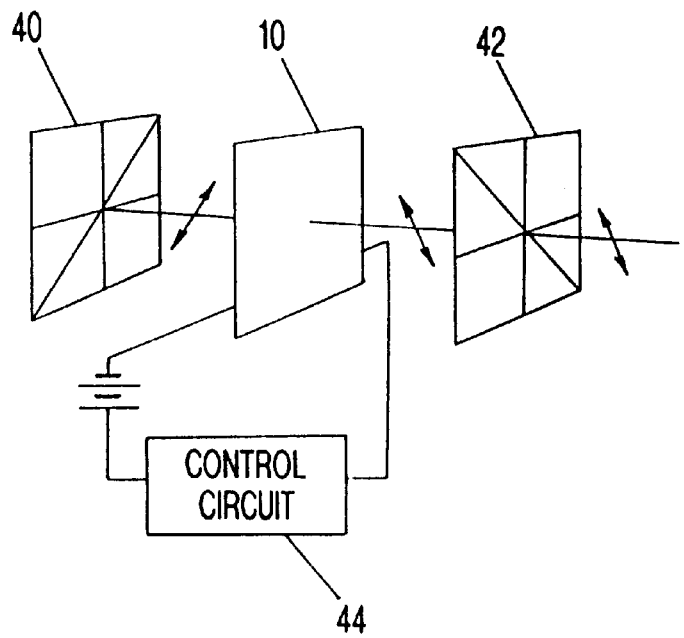
FIG. 6 is a schematic representation of a light valve array in accordance with the present invention.

Referring to FIG. 6, a schematic diagram can be seen illustrating the basic operation of a light valve array in accordance with the present invention. The light valve array 10 is placed between two crossed polarizers 40 and 42, each oriented at 45 degrees relative to the applied transverse electric field. A control circuit 44 controls the voltage applied to the light valve 10. The birefringence in the PLZT material increases with increased applied voltage to the light valve, resulting in a proportional increase in light transmission through the material. The electric field is applied transversely to the optical axis of the system and to the sidewalls of the pedestals 16 by means of the avenue electrodes 12 and the street electrodes 14. The effective birefringence increases as the square of the internal electric field. When voltage is applied to the light valve array 10, creating an "on" state condition, transmittances of the order of 35% are achieved. When no voltage is applied, transmittances of 0.07% to 0.05% result.

By the addition of microprocessor controls and appropriate software well known in the art, the control circuit 44 for a multi-pixel array configuration can selectively address individual avenue electrodes and street electrodes by means of matrix addressing. By this means, an individual pixel can be selected by the choice of a particular avenue electrode and a particular street electrode which together define the "address" of that pixel. The characteristics of the light valve array in accordance with the present invention lends itself to a number of applications, which will now be described.

One preferred application of the light valve array in accordance with the present invention is in direct view displays as a substitute for conventional liquid crystal light valve arrays. The disclosed avenue and street electrode configuration permits application of the invention to small high resolution light valve arrays with center to center pixel dimensions as small as 20 microns. The outer dimensions of the entire light valve display are only limited by the size of the starting material PLZT wafer. For example, a PLZT wafer of 8" in diameter could produce a square direct view display of 5.66" on a side. PLZT water diameters above 8" are not currently commercially available but could soon be developed. Semiconductor processing equipment capable of performing lithography and etching steps on such large wafers is less readily available and substantially more costly.

The inter-electrode spacings of 6–8$\mu$ achievable in a light valve array in accordance with the present invention, coupled with the ability to induce an electric field though pedestal sidewalls, reduce cell activation voltages to a range of 12–15 volts DC. This very significant reduction in cell activation voltage over the prior art is extremely significant, as inexpensive, consumer-oriented liquid crystal displays and other devices are routinely designed to operate at such voltages.

So long as the operating voltage is kept below about 70 volts, the light valve array may still be operated by available very large scale integration (VLSI) silicon technology. Displays requiring more than 70 volts for activation require discrete components for power and addressing or application specific custom silicon devices which greatly increases cost and limits utility.

As direct view displays in accordance with the present invention can be driven by conventional 12–15 VDC VLSI circuitry, they offer a bright and very high resolution substitute for a liquid crystal light valve displays, in any application currently utilizing a liquid crystal light display, with all other components of such devices being substantially the same. Particularly appropriate applications include hand held television screens, small area flat panel display screens, and instrumentation displays. The primary limitation, at least at present, for direct view displays in accordance with the present invention is the limit on the size of a commercially available PLZT wafer. As discussed previously, this currently limits the size of a direct view display to a display of 4.25" or smaller on a side.

An alternative application of the light valve array in accordance with the present invention involves use of the array in a projection device. In such an application, the image produced by the control of pixels on the light valve array is not directly viewed, but is projected by the addition of an illumination and optical system. Depending on the application, a positive image or a negative image may be projected.

Figure 7:
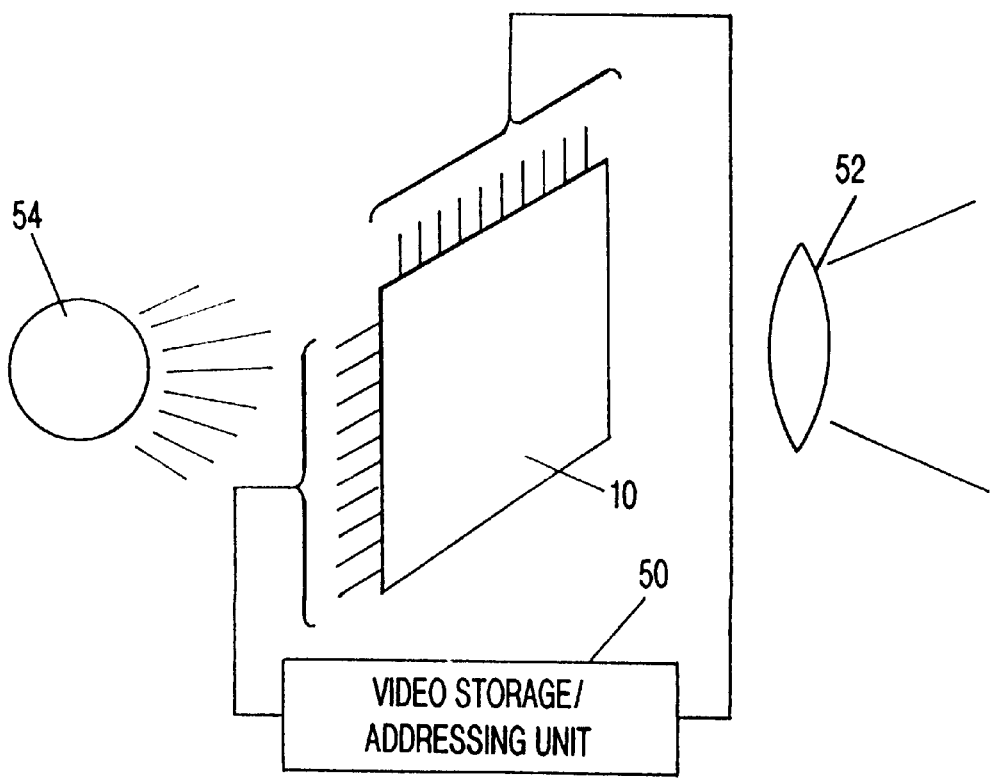
FIG. 7 is a schematic diagram of a high brightness projector employing a light valve array in accordance with the present invention.

FIG. 7 illustrates a high brightness projector employing the light valve array 10. A high brightness motion picture projector may be constructed by providing an light valve array 10 of, for example, 1000×1500 pixel format, which is equivalent to a 35 mm to 60 mm photographic format. The video information to be projected, such as a motion picture, is supplied by a video storage/addressing unit 50. The unit 50 controls the pixels on the light valve array 10 and the image is projected through a lens 52, illumination being supplied by a high intensity light source 54. Consequently, rather than using conventional motion picture film, a motion picture may be projected by obtaining a digital representation of the video frames and controlling the state of pixels, or plurality of pixels for color projection, to project the images. In such a configuration, conventional projection optics and systems may be used. A similar system can be employed for applications requiring high resolution and electronically programmable negatives or photomasks. In such applications, a negative image is projected through the light valve array, rather than a positive image.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A light valve array comprising:
    an electro-optic material having a plurality of intersecting channels therein wherein said channels have a width between approximately 1.5 and 2.5 microns;
    a plurality of pedestals at intersections of said channels;
    a plurality of electrodes deposited in said channels;
    insulating means electrically isolating said electrodes; and
    a voltage supply connected to said electrodes for inducing an electric field within said pedestals.

2. The light valve array of claim 1 further comprising light means for providing light to be passed through said pedestals.

3. The light valve array of claim 1 wherein said electro-optic material is a material selected from the group consisting of LiNbO$_3$, BaTiO$_3$, and lanthanum modified lead zirconate titanate.

4. The light valve array of claim 1 wherein said pedestals have a width between approximately 6 and 8 microns.

5. The light valve array of claim 1 wherein said voltage supply comprises between approximately 12 and 15 volts DC.

6. The light valve array of claim 1 further comprising a plurality of colored filters oriented over said plurality of pedestals.

7. The light valve array of claim 1 further comprising a control circuit for selectively providing voltage from said voltage supply to selected pairs of said plurality of electrodes.

8. The light valve array of claim 1 wherein said plurality of intersecting channels comprise x-oriented channels and y-oriented channels.

9. The light valve array of claim 8 wherein said plurality of electrodes comprise y-oriented electrodes and x-oriented electrodes, wherein said y-oriented electrodes are oriented inside said y-oriented channels and off-shoot into alternating of said x-oriented channels, and said x-oriented electrodes are oriented inside the remaining of said x-oriented channels, on opposite sides of said pedestals from said y-oriented electrodes.

10. A light valve array comprising an electro-optic material having a plurality of intersecting channels therein;
    a plurality of pedestals at intersections of said channels wherein said pedestals have a width between approximately 6 and 8 microns;
    a plurality of electrodes deposited in said channels;
    insulating means electrically isolating said electrodes; and
    a voltage supply connected to said electrodes for inducing an electric field within said pedestals.

11. The light valve array of claim 10 further comprising light means for providing light to be passed through said pedestals.

12. The light valve array of claim 10 wherein said electro-optic material is a material selected from the group consisting of LiNbO$_3$, BaTiO$_3$, and lanthanum modified lead zirconate titanate.

13. The light valve array of claim 10 wherein said channels have a width between approximately 1.5 and 2.5 microns.

14. The light valve array of claim 10 wherein said voltage supply comprises between approximately 12 and 15 volts DC.

15. The light valve array of claim 10 further comprising a plurality of colored filters oriented over said plurality of pedestals.

16. The light valve array of claim 10 further comprising a control circuit for selectively providing voltage from said voltage supply to select pairs of said plurality of electrodes.

17. The light valve array of claim 10 wherein said plurality of intersecting channels comprise x-oriented channels and y-oriented channels.

18. The light valve array of claim 17 wherein said plurality of electrodes comprise y-oriented electrodes and x-oriented electrodes, wherein said y-oriented electrodes are oriented inside said y-oriented channels and off-shoot into alternating of said x-oriented channels, and said x-oriented electrodes are oriented inside the remaining of said x-oriented channels, on opposite sides of said pedestals from said y-oriented electrodes.

19. A light valve array comprising an electro-optic material having a plurality of intersecting channels therein;
    a plurality of pedestals at intersections of said channels;
    a plurality of electrodes deposited in said channels;
    insulating means electrically isolating said electrodes; and
    a voltage supply connected to said electrodes for inducing an electric field within said pedestals wherein said voltage supply comprises between approximately 12 and 15 volts DC.

20. The light valve array of claim 19 further comprising light means for providing light to be passed through said pedestals.

21. The light valve array of claim 19 wherein said electro-optic material is a material selected from the group consisting of LiNbO$_3$, BaTiO$_3$, and lanthanum modified lead zirconate titanate.

22. The light valve array of claim 19 wherein said channels have a width between approximately 1.5 and 2.5 microns.

23. The light valve array of claim 19 wherein said pedestals have a width between 6 and 8 microns.

24. The light valve array of claim 19 further comprising a plurality of colored filters oriented over said plurality of pedestals.

25. The light valve array of claim 19 further comprising a control circuit for selectively providing voltage from said voltage supply to select pairs of said plurality of electrodes.

26. The light valve array of claim 19 wherein said plurality of intersecting channels comprise x-oriented channels and y-oriented channels.

27. The light valve array of claim 26 wherein said plurality of electrodes comprise y-oriented electrodes and x-oriented electrodes, wherein said y-oriented electrodes are oriented inside said y-oriented channels and off-shoot into alternating of said x-oriented channels, and said x-oriented electrodes are oriented inside the remaining of said x-oriented channels, on opposite sides of said pedestals from said y-oriented electrodes.

28. A light valve array comprising an electro-optic material having a plurality of intersecting channels therein;
   a plurality of pedestals at intersections of said channels;
   a plurality of electrodes deposited in said channels;
   insulating means electrically isolating said electrodes; and
   a voltage supply connected to said electrodes for inducing an electric field within said pedestals further comprising a control circuit for selectively providing voltage from said voltage supply to selected pairs of said plurality of electrodes.

29. The light valve array of claim 28 further comprising light means for providing light to be passed through said pedestals.

30. The light valve array of claim 28 wherein said electro-optic material is a material selected from the group consisting of $LiNbO_3$, $BaTiO_3$, and lanthanum modified lead zirconate titanate.

31. The light valve array of claim 28 wherein said channels have a width between approximately 1.5 and 2.5 microns.

32. The light valve array of claim 28 wherein said pedestals have a width between 6 and 8 microns.

33. The light valve array of claim 28 wherein said voltage supply comprises between approximately 12 and 15 volts DC.

34. The light valve array of claim 28 further comprising a plurality of colored filters oriented over said plurality of pedestals.

35. The light valve array of claim 28 wherein said plurality of intersecting channels comprise x-oriented channels and y-oriented channels.

36. The light valve array of claim 35 wherein said plurality of electrodes comprise y-oriented electrodes and x-oriented electrodes, wherein said y-oriented electrodes are oriented inside said y-oriented channels and off-shoot into alternating of said x-oriented channels, and said x-oriented electrodes are oriented inside the remaining of said x-oriented channels, on opposite sides of said pedestals from said y-oriented electrodes.

37. A method of manufacturing a light valve array, the method comprising the steps of:
   a) etching a plurality of intersecting channels into an electro-optic material;
   b) depositing a conductive coating for dissipating residual electric charge;
   c) depositing a first conductive layer in certain of the channels;
   d) depositing an insulating layer upon the first conductive layer in certain of the channels; and
   e) depositing a second conductive layer in certain of the channels.

38. The method of claim 37 further comprising the step of depositing a conductive coating for dissipating a residual electric charge after the depositing a second conductive layer step.

39. The method of claim 37 wherein the depositing a first conductive layer comprises depositing a first conductive metallization layer in selected channels in a series of adjacent combs, wherein the teeth of each comb are oriented in certain alternating parallel channels, and the backbone of each comb is oriented in an intersecting channel to the parallel channels, thus producing a first plurality of electrodes.

40. The method of claim 39 wherein the depositing a second conductive layer comprises depositing a second conductive metallization layer in selected channels parallel to and adjacent the channels in which the teeth of the first conductive layer are oriented thus producing a second plurality of electrodes.

41. The method of claim 40 further comprising the step of electrically connecting a transistor to each electrode of the first and second plurality of electrodes to block voltage to the electrodes until a selected voltage is reached.

42. The method of claim 40 further comprising the step of depositing a colored filter over the electro-optic material between each pair of adjacent first and second electrodes.

43. The method of claim 39 wherein the depositing an insulating layer comprises depositing an insulating layer upon the backbone of the comb of the first conductive metallization layer.

44. A method of manufacturing a light valve array, the method comprising the steps of:
   a) etching a plurality of intersecting channels into an electro-optic material;
   b) depositing a first conductive layer in certain of the channels;
   c) depositing an insulating layer upon the first conductive layer in certain of the channels;
   d) depositing a second conductive layer in certain of the channels; and
   e) depositing a conductive coating for dissipating residual electric charge.

45. The method of claim 44 further comprising the step of depositing a conductive coating for dissipating residual electric charge between the etching step and the depositing a first conductive layer step.

46. The method of claim 44 wherein the depositing a first conductive layer comprises depositing a first conductive metallization layer in selected channels in a series of adjacent combs, wherein the teeth of each comb are oriented in certain alternating parallel channels, and the backbone of each comb is oriented in an intersecting channel to the parallel channels, thus producing a first plurality of electrodes.

47. The method of claim 46 wherein the depositing a second conductive layer comprises depositing a second conductive metallization layer in selected channels parallel to and adjacent the channels in which the teeth of the first conductive layer are oriented thus producing a second plurality of electrodes.

48. The method of claim 47 further comprising the step of electrically connecting a transistor to each electrode of the first and second plurality of electrodes to block voltage to the electrodes until a selected voltage is reached.

49. The method of claim 47 further comprising the step of depositing a colored filter over the electro-optic material between each pair of adjacent first and second electrodes.

50. The method of claim 46 wherein the depositing an insulating layer comprises depositing an insulating layer upon the backbone of the comb of the first conductive metallization layer.

51. A method of manufacturing a light valve array, the method comprising the steps of:
   a) etching a plurality of intersecting channels into an electro-optic material;
   b) depositing a first conductive metallization layer in selected channels in a series of adjacent combs, wherein the teeth of each comb are oriented in certain alternating parallel channels, and the backbone of each comb is oriented in an intersecting channel to the parallel channels, thus producing a first plurality of electrodes;
   c) depositing an insulating layer upon the first conductive layer in certain of the channels;
   d) depositing a second conductive metallization layer in selected channels parallel to and adjacent the channels in which the teeth of the first conductive layer are oriented thus producing a second plurality of electrodes; and
   e) electrically connecting a transistor to each electrode of the first and second plurality of electrodes to block voltage to the electrodes until a selected voltage is reached.

52. The method of claim 51 further comprising the step of depositing a conductive coating for dissipating residual electric charge between the etching step and the depositing a first conductive layer step.

53. The method of claim 51 further comprising the step of depositing a conductive coating for dissipating a residual electric charge after the depositing a second conductive layer step.

54. The method of claim 51 further comprising the step of depositing a colored filter over the electro-optic material between each pair of adjacent first and second electrodes.

55. The method of claim 51 wherein depositing an insulating layer comprises depositing an insulating layer upon the backbone of the comb of the first conductive metallization layer.

56. A method of manufacturing a light valve array, the method comprising the steps of:
   a) etching a plurality of intersecting channels into an electro-optic material;
   b) depositing a first conductive metallization layer in selected channels in a series of adjacent combs, wherein the teeth of each comb are oriented in certain alternating parallel channels, and the backbone of each comb is oriented in an intersecting channel to the parallel channels, thus producing a first plurality of electrodes;
   c) depositing an insulating layer upon the first conductive layer in certain of the channels;
   d) depositing a second conductive metallization layer in selected channels parallel to and adjacent the channels in which the teeth of the first conductive layer are oriented thus producing a second plurality of electrodes; and
   e) depositing a colored filter over the electro-optic material between each pair of adjacent first and second electrodes.

57. The method of claim 56 further comprising the step of depositing a conductive coating for dissipating residual electric charge between the etching step and the depositing a first conductive layer step.

58. The method of claim 56 further comprising the step of depositing a conductive coating for dissipating a residual electric charge after the depositing a second conductive layer step.

59. The method of claim 56 further comprising the step of electrically connecting a transistor to each electrode of the first and second plurality of electrodes to block voltage to the electrodes until a selected voltage is reached.

60. The method of claim 56 wherein depositing an insulating layer comprises depositing an insulating layer upon the backbone of the comb of the first conductive metallization layer.

* * * * *